Figure 1:
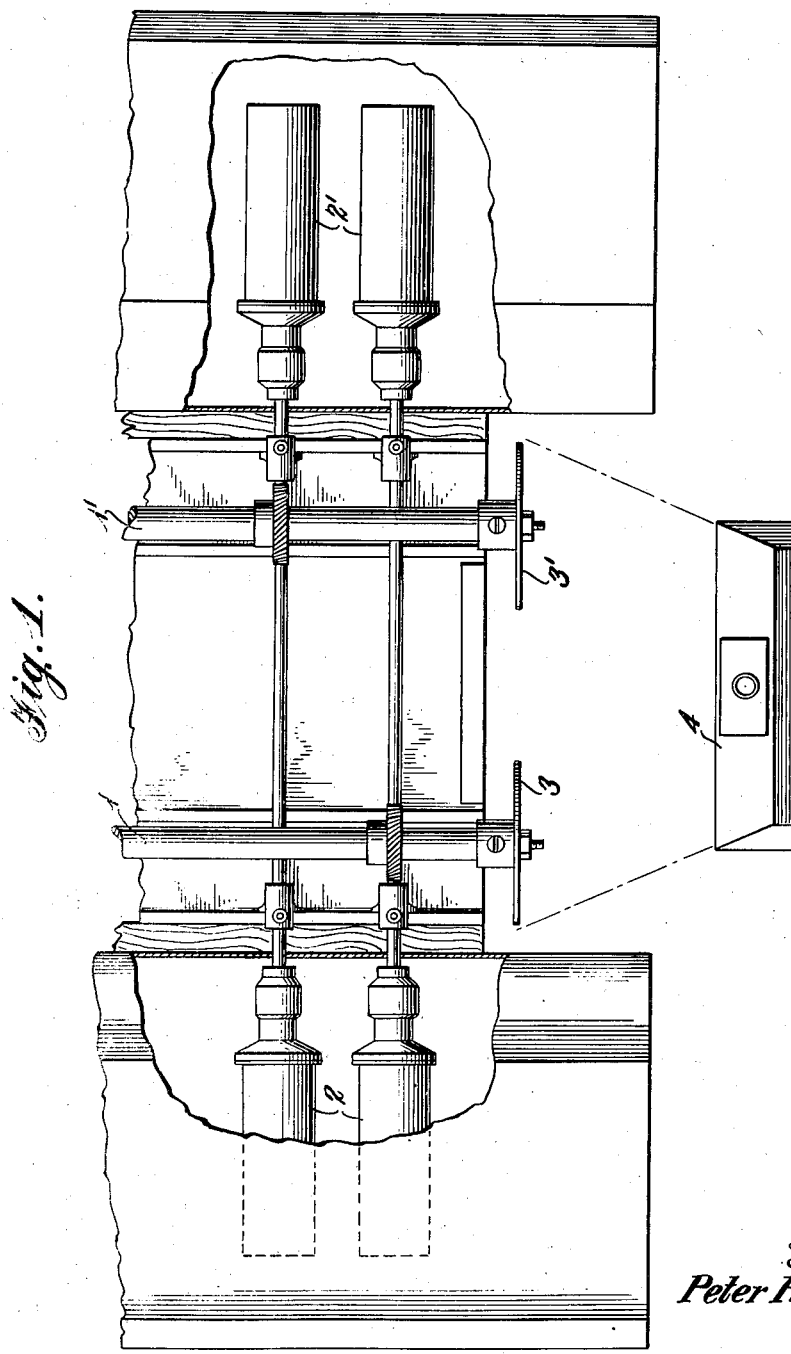
Figure 2:
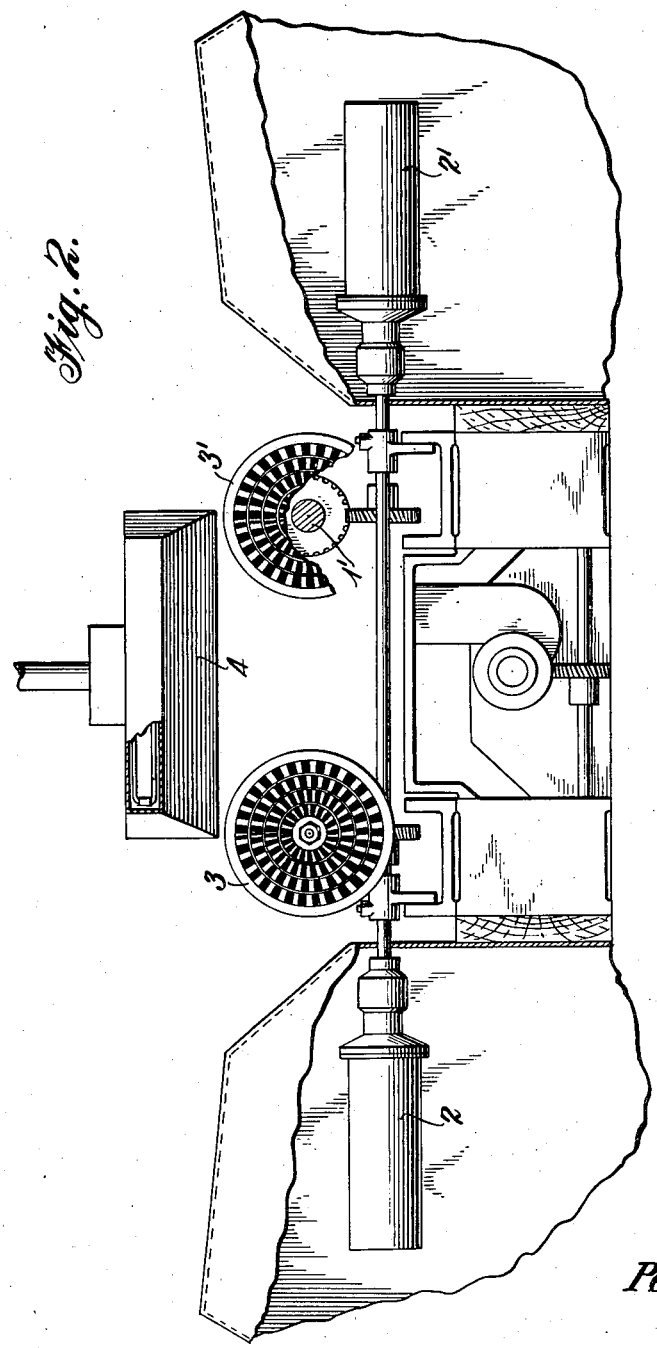
Figure 3:
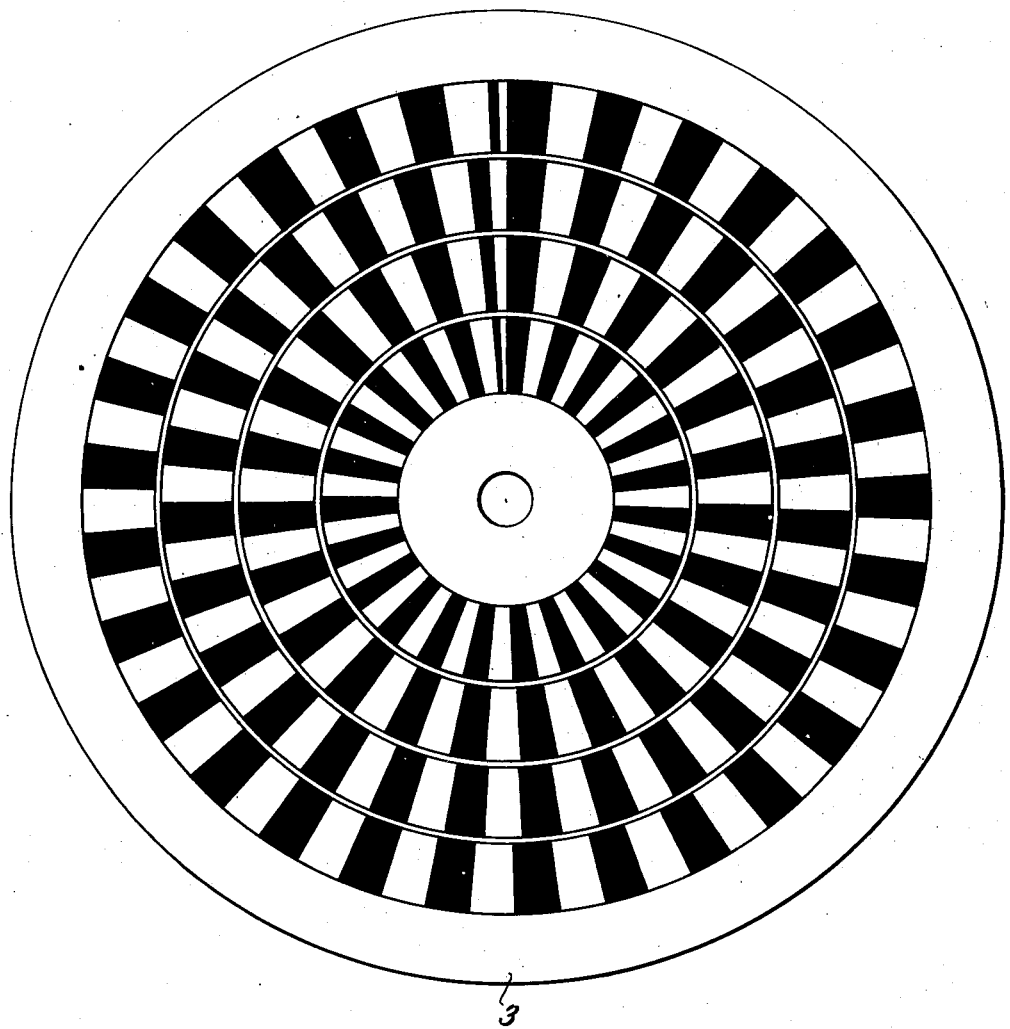

June 7, 1938. P. P. KRIEK 2,119,627
DEVICE FOR VERIFYING THE SPEED OF ROTATING SHAFTS
Filed Feb. 18, 1936 3 Sheets-Sheet 1

Inventor
Peter P. Kriek
By Albin F. Knight
Attorney

Patented June 7, 1938

2,119,627

UNITED STATES PATENT OFFICE 2,119,627

DEVICE FOR VERIFYING THE SPEED OF ROTATING SHAFTS

Peter P. Kriek, Enka, N. C., assignor to American Enka Corporation, Enka, N. C., a corporation of Delaware Application February 18, 1936, Serial No. 64,574

3 Claims. (Cl. 88—14)

This invention relates to mechanism employed in connection with the manufacture of artificial silk and more particularly to a stroboscopic type speed indicating device therefor.

The stroboscopic principle has been known for years and utilized in numerous different applications. One commonly known use in industry is in the form of the stroboscope per se. The stroboscope is an instrument which permits the study of mechanisms while in rapid motion whereby the moving parts appear to be stationary.

The present invention is analogous to the stroboscopic principle only to the extent that a combination of elements is employed in which at least two of the elements are substantially synchronized to give the desired results. The stroboscope imparts to a moving element the appearance of being stationary either by synchronizing light impulses emitted therefrom with the speed of the element, or by synchronizing the speed of an aperture moving past the element with the speed of the element itself.

In the manufacture of artificial silk the speed of rotation of the shafts which drive the bobbins and pots during the collection of the freshly spun artificial silk thereon, must be controlled within predetermined limits in order to impart to the thread the correct amount of stretch and tension both during its path of travel and during collection. Further, in the event that godet wheels and the like are employed for withdrawing the thread from the spinning bath and stretching the same, it is highly essential that the speeds of the shafts driving these wheels be checked and controlled. Past practice in determining the R. P. M. of any and all shafts used on the artificial silk spinning machines involved the tedious procedure of requiring workers to check the R. P. M. by means of mechanical devices known as revolution counters. These revolution counters were attached to the shaft and registered revolutions thereof whereby with the assistance of a stop watch the R. P. M. could be computed.

Therefore, the primary object of this invention is to provide an improved apparatus which will immediately indicate whether various rotating shafts are driven within the proper speed ranges; and whereas the device will be described in application to artificial silk spinning machines, it is to be understood that the scope of the invention is intended to cover a speed indicator for any rotating shaft wherein it is necessary to control and maintain certain speeds within predetermined limits.

The invention further contemplates the provision of a disc having light and dark sectors, which disc is adaptable for mounting on the end of a rotating shaft to revolve therewith, and a luminescent light which is supplied from an alternating current source of a fixed constant frequency.

Another object of the present invention is the utilization of a device to directly indicate the correct R. P. M. of a shaft within permissible upper and lower limits and also a plurality of different speeds for the same shaft in cases where it is desirable to increase or decrease the R. P. M. during one operation.

Other objects and advantages will be apparent from the following detailed description when considered in connection with the accompanying drawings wherein:

Fig. I is a part plan view of an embodiment of the invention when applied to an artificial silk manufacturing machine of the bobbin type;

Fig. II exemplifies an end elevation of the machine illustrated in Fig. I, and

Fig. III is a detailed view of the type disc employed having the necessary number of light and dark sectors for upper and lower speed limits of two different speeds.

As previously stated, the invention is applicable for verifying the R. P. M. of any shaft whether in connection with the manufacture of artificial silk or with any other mechanisms. However, for the purpose of describing the present construction in detail it is sufficient to apply the same to the bobbin type spinning machine.

Referring to the drawings, 1 and 1' indicate shafts for driving series of bobbins 2 and 2'. These shafts are driven at a predetermined speed through a suitable chain of gears (not shown). Light metallic or composition discs 3 and 3' are suitably mounted on the shafts at their ends opposite the source of power. These discs have a plurality of light and dark sectors on their faces as shown in Fig. III. The number, size and purpose of these sectors will be hereinafter more fully explained. A lamp 4 is connected to an alternating current source (not shown) of a fixed constant frequency. This lamp may be of incandescent type but must provide a sharply defined periodically varying illumination. Preferably a luminescent gas filled lamp such as a neon lamp is employed.

To compute the number of light and dark sectors, which also determines the degrees in each on the disc, the R. P. M. of the shaft must be known and also the frequency of the alternating current. Ordinarily, if the R. P. M. were constant and had to be verified exactly rather than within a range having permissible upper and lower limits, then the number of sectors should be such that when they are rotating with the shaft, they appear stationary at the intervals when the neon lamp has illuminated the disc. Assuming, for example, a 60 cycle alternating current has 7200 light impulses per minute and a shaft rotates 300 times per minute, then 7200 divided by 300 equals 24, the number of light sectors necessary on the disc, and correspondingly, 24 dark sectors. When utilizing this number of light and dark sectors on a disc, they will appear stationary when the R. P. M. of the shaft is exactly 300; and if this speed varies the slightest degree, the sectors will appear to be moving backward or forward, depending on whether the R. P. M. is less or greater than 300.

Although the present invention contemplates the aforedescribed method of computing the number of light and dark sectors to be used on discs for verifying constant speeds exactly, the inventive concept herein is especially adaptable in apparatus for the manufacture of artificial silk wherein the speed of the shafts for driving bobbins, et cetera, is increased or decreased during one continuous operation. Further, the initial, intermediate and final R. P. M. of the shafts may vary within small upper and lower limits and still produce practical results.

For example, it may be desirable to verify the R. P. M. of a shaft driving a series of bobbins and the driving mechanism has been regulated to rotate the shaft with an initial speed of 310 R. P. M. and a final speed of 260 R. P. M. Permissible upper and lower limits for both speeds is +2 or −2, i. e., the initial speed may vary from 308 to 312 R. P. M. and the final speed may vary from 258 to 262 R. P. M. and still maintain practical working conditions. In this case the number of light and dark sectors for the disc can be computed for the upper and lower limits of both the initial and final speeds. The disc accordingly will have superimposed thereon four concentric circular bands of light and dark sectors. Each band has the correct number of sectors to correspond with each of the four speeds. A neon lamp is employed and is fed from a 60 cycle A. C. source. This lamp emits 7200 light impulses per minute. Now in order to compute the number of sectors for each band $$M = \frac{7200}{R.P.M.}$$

where the R. P. M. is the speed of the shaft in each case and N the number of light sectors. Knowing the R. P. M. in each case to be 308, 312, 258 and 262 then N is 23.38, 23.08, 27.91 and 27.48 light sectors respectively. In this instance where the numbers of sectors do not come out even such as 23.38, the .38 fraction of a sector is calculated and superimposed on the disc together with the normal size sectors. It is obvious that the same number of dark sectors are used and also the equivalent fraction thereof.

When utilizing the speeds indicated in the foregoing example, if the initial speed is 310 R. P. M., the band having 23.38 sectors will appear to be moving slowly backward while the band having 23.08 sectors will appear to be moving slowly forward. Between the permissible upper and lower limits substantially the same effect is produced. The initial R. P. M. can therefore be readily checked within practical speed ranges. This permissible range of speed often results from slight variations caused by variable slip in the motor or other driving parts. However, in the event the R. P. M. increases or decreases to an impractical extent as a result of a defect in the mechanism, then this can be readily determined by observation of the disc wherein the sectors for the two corresponding bands appear to move in the same direction. When the initial R. P. M. is being verified, the two bands corresponding to the final range of speeds appear to rotate rapidly; but as the spinning operation proceeds to completion, the final R. P. M. can be verified in the same manner as the initial by observing the two bands having sectors to correspond to the final R. P. M.

Although the illustrated preferred embodiment of the invention has been applied to apparatus for the manufacture of artificial silk, it is to be understood that various other adaptations and modifications can be made without departing from the spirit and scope thereof. Furthermore, the specific example given above refers to practical working speeds for shafts driving bobbins. If it is desired to verify other ranges of speeds, the different number of sectors may be readily computed; and if several ranges of speeds for one spinning operation must be checked, then additional bands of sectors may be superimposed on the disc.

What I claim is:

1. In a device for determining speeds of rotation, the improvement which comprises in combination, a regularly pulsating light source and a rotatable member illuminated thereby, said member carrying at least one series of indicia of equal width regularly spaced along an arc around the center of rotation, the angular distance between the center lines of any two such regularly spaced successive indicia measured on the arc being a non-aliquot part of the circumference of the circle of which the arc forms a part, and the portion of the circle included in the arc being such that the equally spaced indicia will appear substantially stationary when rotated at the speed for which they are calculated, so that the device may determine speeds different from those determinable by similar devices in which the angular distance between the center lines of any two regularly spaced successive indicia divides into the circumference of the circle evenly to provide a whole number.

2. In a device for determining speeds of rotation, the improvement which comprises in combination, a regularly pulsating light source and a rotatable member illuminated thereby, said member carrying a plurality of concentric arcs around the center of rotation, each comprising a series of indicia of equal width regularly spaced along the arc around the center of rotation, the angular distance between the center lines of any two regularly spaced successive indicia measured on the arc being a non-aliquot part of the circumference of the circle of which the arc forms a part in at least one series of indicia, the angular distance between the center lines of any two regularly spaced successive indicia measured on the arc being different in each series, and the portions of the circles included in the respective arcs being such that the equally spaced indicia in each series will appear substantially stationary when rotated at the respective speeds for which they are calculated, so that the device may determine a number of speeds of which at least one is different from speeds determinable by similar devices in which the angular distance between the center lines of any two regularly spaced successive indicia divides into the circumference of the circle evenly to provide a whole number.

3. In a device for accurately checking predetermined speeds of rotation, the improvement which comprises in combination a regularly pulsating light source and a rotatable member illuminated thereby, said member carrying at least one series of indicia of equal width regularly spaced along an arc around the center of rotation, the total angular distance defined by the sum of the angular distances measured on the arc between the center lines of the regularly spaced successive indicia of equal width being less than the circumference of the circle of which the arc forms a part, and the difference between the total angular distance and the circumference of the circle being less than the angular distance between the center lines of any two successive indicia measured on the arc, so that the device may check speeds different from those determinable by similar devices in which the total angular distance defined by the sum of the angular distances between the center lines of the successive indicia is equal to the circumference.

PETER P. KRIEK.